(12) United States Patent
Schlueter et al.

(10) Patent No.: US 9,808,773 B2
(45) Date of Patent: Nov. 7, 2017

(54) ASSEMBLY FOR CONTROLLING EDUCTIVE DISPENSING

(71) Applicant: Dema Engineering Company, St. Louis, MO (US)

(72) Inventors: James M. Schlueter, O'fallon, MO (US); Timothy L. Kinser, St. Peters, MO (US); Fredrick B. Jedlicka, Jerseyville, IL (US)

(73) Assignee: Dema Engineering Company, St. Louis, MO (US)

( * ) Notice: Subject to any disclaimer, the term of this patent is extended or adjusted under 35 U.S.C. 154(b) by 413 days.

(21) Appl. No.: 14/294,954

(22) Filed: Jun. 3, 2014

(65) Prior Publication Data

US 2015/0344289 A1    Dec. 3, 2015

(51) Int. Cl.
| | | |
|---|---|---|
| *G05G 9/00* | (2006.01) | |
| *B01F 5/04* | (2006.01) | |
| *F16K 31/53* | (2006.01) | |
| *F04F 5/10* | (2006.01) | |
| *F04F 5/46* | (2006.01) | |
| *B05B 7/00* | (2006.01) | |
| *G05D 11/00* | (2006.01) | |
| *B01F 3/08* | (2006.01) | |

(52) U.S. Cl.
CPC .............. *B01F 5/043* (2013.01); *B01F 5/042* (2013.01); *B01F 5/0421* (2013.01); *B05B 7/00* (2013.01); *F04F 5/10* (2013.01); *F04F 5/463* (2013.01); *F04F 5/466* (2013.01); *F16K 31/535* (2013.01); *G05D 11/00* (2013.01); *G05D 11/003* (2013.01); *B01F 2003/0896* (2013.01); *Y10T 74/19074* (2015.01)

(58) Field of Classification Search
CPC .. G01G 9/00; G01G 9/02; F16K 31/44; F16K 31/53; F16K 31/535; G05G 9/00; G05G 9/02; B01F 5/0421; B01F 5/043; B01F 2003/0896; B05D 11/00; B05D 11/02; B05D 11/003; B05D 11/03; G05D 11/00; G05D 11/02; G05D 11/003; G05D 11/03
USPC ...................................... 74/665 GE
See application file for complete search history.

(56) References Cited

U.S. PATENT DOCUMENTS

| | | | | |
|---|---|---|---|---|
| 2,784,703 A | * | 3/1957 | Davis ........................ | F15B 9/08 137/595 |
| 3,036,496 A | * | 5/1962 | Frederick, Jr. ......... | G03B 21/00 352/89 |
| 3,218,023 A | * | 11/1965 | Kirkup .................... | F16K 31/12 137/625.47 |
| 3,365,965 A | * | 1/1968 | French ..................... | G05G 5/08 137/595 |
| 4,150,769 A | * | 4/1979 | James ................. | B01F 15/0237 222/137 |

(Continued)

*Primary Examiner* — J. Casimer Jacyna
(74) *Attorney, Agent, or Firm* — Husch Blackwell LLP

(57) ABSTRACT

An assembly for controlling the eductive dispensing of multiple chemical fluids is described. The assembly is designed to detachably engage with existing eductor valve assemblies as either an original part or as a replacement part. The assembly comprises a plurality of selector gears that rotatably engage with eductor valve assemblies. The selector gears are in communication with a control gear. When the assembly is attached to a plurality of eductor valve assemblies an individual can control the rotation of multiple valve assemblies by rotating a single control knob.

8 Claims, 4 Drawing Sheets

(56) References Cited

U.S. PATENT DOCUMENTS

| | | | | |
|---|---|---|---|---|
| 4,533,113 | A | * | 8/1985 | Francart, Jr. .......... F16K 5/0242 |
| | | | | 137/595 |
| 8,307,851 | B2 | * | 11/2012 | Warsowe ................ E03C 1/021 |
| | | | | 137/595 |
| 2009/0050830 | A1 | * | 2/2009 | Albert ................ F02B 29/0418 |
| | | | | 251/129.11 |
| 2013/0187073 | A1 | * | 7/2013 | Carlson .................. F16K 31/44 |
| | | | | 251/304 |
| 2015/0101693 | A1 | * | 4/2015 | Enomoto ................ F16K 11/22 |
| | | | | 137/597 |

* cited by examiner

ASSEMBLY FOR CONTROLLING EDUCTIVE DISPENSING

CROSS-REFERENCE TO RELATED APPLICATIONS

Not applicable

FIELD OF THE INVENTION

The present invention relates generally to eductive flow control systems and, more particularly, to a selection and flow control mechanism for an eductive dispensing system.

BACKGROUND OF THE INVENTION

Eductive dispensing systems designed to dispense multiple chemicals from a common outlet are generally known in the art. These systems generally utilize a centralized control box that is connected to a supply of motive fluid, which is usually water, a supply of at least one chemical—and in the case of two or more chemicals being supplied, a means of selecting between the chemicals—and an outlet, for example, a hose connected to a spray wand or nozzle, to dispense the desired mixture. In the case of multi-chemical systems, mechanisms are required to (1) turn the flow of the eductive fluid on and off, which controls the operation of the entire system, and (2) select the particular chemical or chemicals to be dispensed with the eductive fluid.

Known eductive dispensing systems often utilize two or more eductors to dispense two chemical concentrates into a stream of liquid to provide a diluted solution. These chemicals are often dispensed in specified ratios using specialized selector valves. These selector valves often rotate to create intermittent fluid communication between a plurality of chemical sources and the stream of liquid. U.S. Pat. Nos. 5,377,718; 5,653,261; 7,331,488; and U.S. Patent Pub. 2012/0247593 illustrate representative, multi-chemical eductive dispensing systems.

SUMMARY OF THE INVENTION

In one aspect, the invention is an assembly for controlling eductive dispensing of multiple fluids from a plurality of sources. Such an assembly comprises a first housing member, a second housing member, and a gearing mechanism intermediate the first and second housing members. The gearing mechanism comprises a control gear and a plurality of selector gears in communication with the control gear. It may also include a mechanism, such as a timing belt, gears, etc., that transfers rotational energy from the control gear to the plurality of selector gears.

The assembly can further comprise a plurality of eductors, each of the eductors having a selector valve assembly that is rotationally engaged with one of the selector gears such that rotation of the control gear rotates the selector gears and the selector valve assemblies.

In another aspect, the invention is an assembly for controlling eductive dispensing of multiple fluids from a plurality of sources. Such an assembly comprises a gearing mechanism. The gearing mechanism comprises a control gear and a plurality of selector gears in communication with the control gear. It may also include a mechanism, such as a timing belt, gears, etc., that transfers rotational energy from the control gear to the plurality of selector gears.

This assembly also comprises a control knob engaging with the control gear, a plurality of interlocks engaged with the selector gears, where the interlocks are rotatable and capable of engaging with selector valve assemblies.

In another aspect, the invention is a method for controlling eductive dispensing of fluids from a plurality of fluid sources. The steps of the method comprise engaging a gearing mechanism with a plurality of rotatable selector valve assemblies wherein the gearing mechanism comprises a control gear and a plurality of selector gears in rotational engagement with the plurality of selector valve assemblies and in communication with the control gear.

The control gear is then rotated thereby rotating the selector gears and the selector valve assemblies to selectively establish fluid communication between the fluid sources and the eductor valve assemblies. After the desired fluid communication is established, the method continues by actuating at least one of a plurality of valves attached to said plurality of eductor valve assemblies thereby selectively dispensing at least one fluid from the fluid sources.

DETAILED DESCRIPTION OF THE INVENTION

Figure 1:
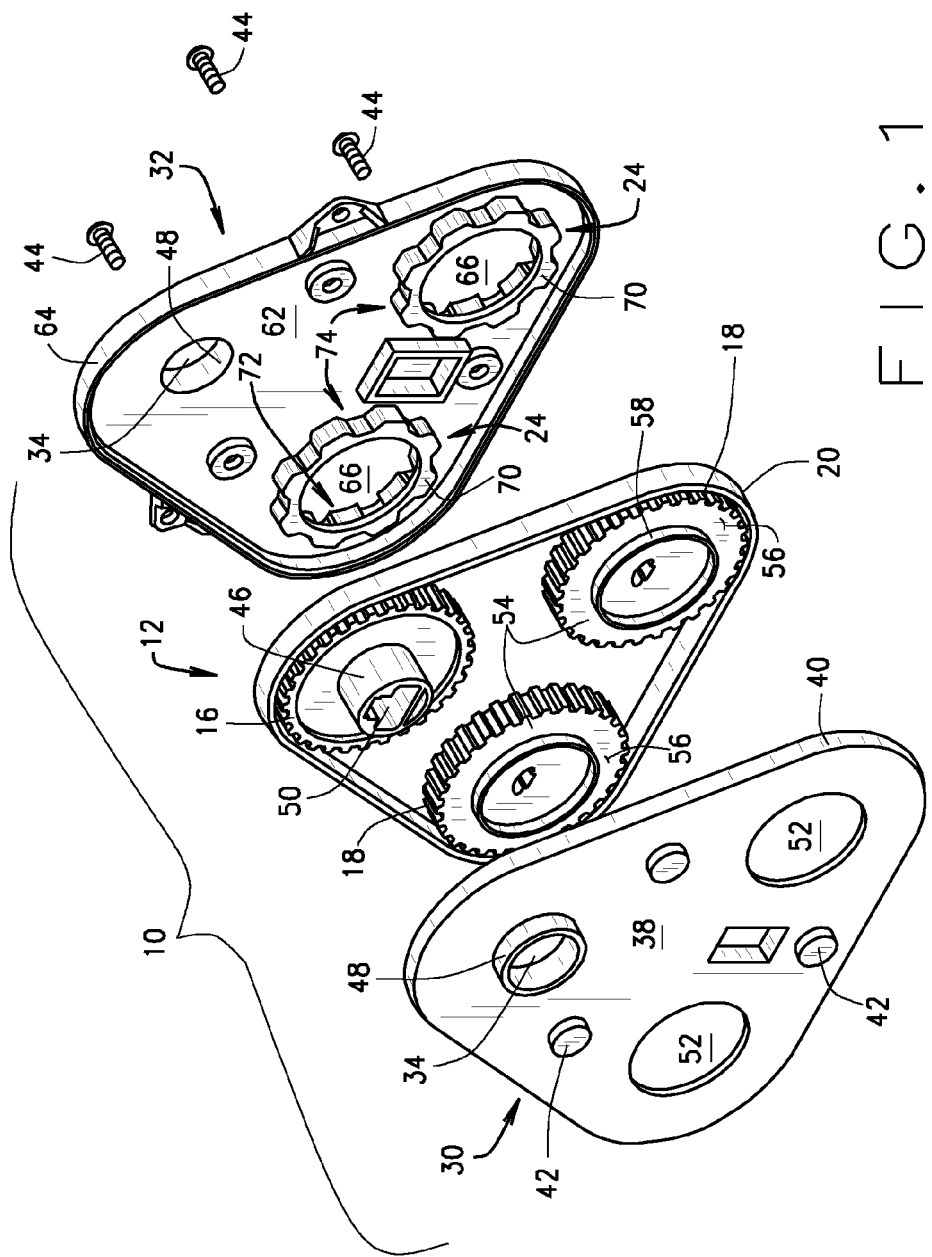
FIG. 1 is an exploded view of an assembly according to the invention.

In the following detailed description, numerous specific details are set forth to provide a thorough understanding of the invention. However, it will be understood by those skilled in the art that the present invention may be practiced without these specific details. For example, well-known methods, procedures, and components have not been described in detail so as not to obscure the present invention.

FIGS. 1-4 illustrate a preferred embodiment of an assembly 10 for controlling selective eductive dispensing of multiple fluids, such as concentrated chemicals, from a plurality of fluid sources. In broad terms, the assembly 10 comprises a gearing mechanism 12 preferably contained within a housing 14; a control knob 22 that engages with the gearing mechanism; and a plurality of interlocks 24 that provide detachable engagement with a plurality of eductor valve assemblies 28. One of the benefits of the present invention is that it is designed to reduce confusion and mistakes when dispensing chemical solutions.

In preferred embodiments the assembly housing 14 comprises a first housing member 30 and a second housing member 32. The gearing mechanism 12 is intermediate the first housing member 30 and the second housing member 32.

The design of the housing members is determined, in part, by the design of the gearing mechanism 12 and vice versa. FIG. 1 shows a gearing mechanism 12 comprising a control gear 16 and two selector gears 18. Those skilled in the art recognize that alternative designs could include three, four or more selector gears 18. The following detailed description is based on the three gear system of FIG. 1. This narrative convenience should not be interpreted as limiting the scope of the invention.

The first housing member 30 is defined by a cover 38 having a plurality of first housing apertures whose number equals the total number of gears. The first housing apertures are positioned to be coaxial with and engage with the gears of the gearing mechanism 12. The first housing member shown in FIG. 1 has three apertures: one control gear aperture 34 and two selector gear apertures 52.

A flange 40 extends from the perimeter of the cover 38 at multiple points. In the embodiment shown in FIG. 1 the flange 40 extends completely around the perimeter of the cover 38. The flange 40 slidably engages with a similar flange on the second housing member 32, discussed in more detail below.

The first housing member 30 is also defined by a plurality of small cylinders 42 that extend from the surface of the cover 38. The small cylinders 42 schematically represent receivers for one or more screws 44 that connect the first housing member 30 to the second housing member 32.

The gearing mechanism 12 comprises a control gear 16, a plurality of selector gears 18, and a timing belt 20 that transfers rotational energy from the control gear 16 to the plurality of selector gears 18.

Figure 2:
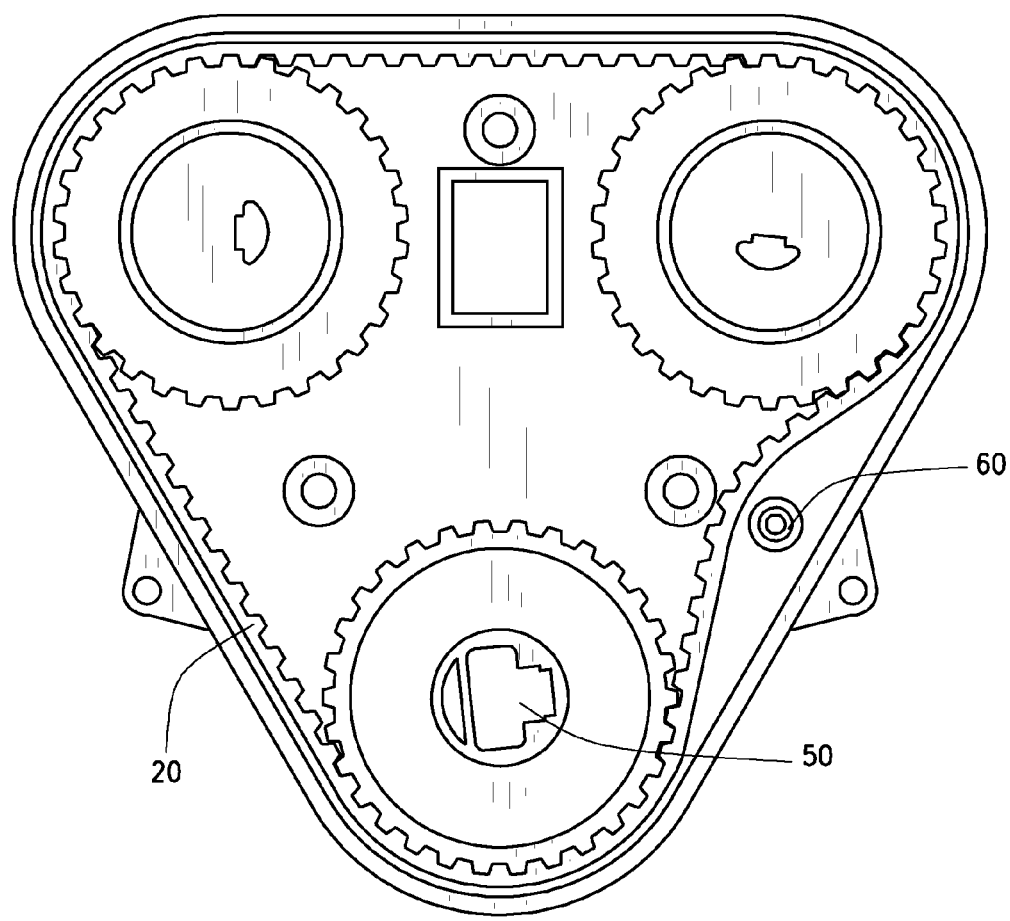
FIG. 2 is a view illustrating a gearing mechanism engaged with a housing member.

In preferred embodiments the control gear 16 and the selector gears 18 are made of a polymer and possess cogs along their outer circumference that engage with teeth on the interior surface of the timing belt 20 as shown in FIG. 2.

The control gear 16 is partially defined by a first control gear stem 46 that is coaxial with and extends from the body of the control gear. The first control gear stem 46 aligns with and engages a control gear aperture 34 in the first housing member 30. In preferred embodiments a sleeve 48 extending from the cover 38 receives the control gear stem 46. The first control gear stem 46 is designed to engage with a control knob 22. The method of engagement between the first control gear stem 46 and the control knob 22 may be any those known in the art. In the embodiment shown in FIG. 3 the control knob 22 possesses a T-shaped stem 76 that engages with a T-shaped channel 50 in the first control gear stem 46.

In preferred embodiments the control gear 16 possess a second coaxial stem (not shown) that extends from the control gear 16 body opposite the first control gear stem 46. This second stem engages with a coaxial control gear aperture 34 and sleeve 48 associated with the second housing member 32.

The control gear stems, apertures and sleeves are sized such that the control gear 16 is freely rotatable when it is housed within the assembly 10 and rotational forces are applied to the engaged control knob 22.

The selector gears 18 are similar to the control gear 16 in that they are circular and possess cogs around their outer circumference. In preferred embodiments they have the same diameter as the control gear 16 but they can have a larger or smaller diameter if desired. The selector gears 18 are preferably made of a polymer.

Turning again to FIG. 1, a selector gear 18 is defined by a selector gear body 54 having a first face 56 adjacent the first housing member 30 and a second face (not shown) adjacent the second housing member 32. A cylindrical sleeve 58 protrudes from the first face 56. The outer diameter of the cylindrical sleeve 58 is approximately equal to the diameter of the aligned selector gear aperture 52. The outer diameters of the sleeve 58 and aperture 52 are designed such that the aperture 52 can receive the sleeve 58 snugly yet maintain free rotation of the sleeve 58 within the aperture 52.

The second face (not shown) of the selector gear 18 is defined by a channel (not shown) that matches the size and shape of an interlock 24. The interlock 24 provides the mechanical connection between the selector gear 18 and selector valve assembly 28. The interlock 24 is discussed in more detail below. When the assembly 10 is complete the interlock 24 mates with the channel in the second face of the selector gear 18.

A timing belt 20 extends around the control gear 16 and the selector gears 18. The timing belt 20 transfers rotational energy applied to the control gear 16 via the control knob 22 to the plurality of selector gears 18 and ultimately to a plurality of interlocks 24. In preferred embodiments the timing belt 20 is made of a polymer such as rubber and has integrated teeth to match the cogs present in each of the gears. The timing belt 20 should fit snuggly around the gears. A screw 44 or a pin 60 (FIG. 2) can be positioned to provide tension on the timing belt 20 to help maintain contact between the belt and the gears.

The second housing member 32 engages with the first housing member 30 to enclose the gearing mechanism 12. The second housing member 32 is similar to the first housing member 30 in that it is defined by a second housing member cover 62 and a second housing member flange 64. Preferably, the shape of the second housing member 32 is such that it mirrors the first housing member 30. The second housing member cover 62 mirrors the first housing member cover 38 in that it possesses a plurality of interlock apertures 66 that are coaxially aligned with the selector gears 18 and selector gear apertures 52 of the first housing member cover 30. The second housing member cover 62 also possesses a control gear aperture 34 that is coaxial with the control gear 16 and is sized to receive a second control gear stem (76) that extends opposite the control gear stem 46.

The dimensions of the second housing member 32 are such that the two flanges 64 and 40 slideably engage with one another. The depth of the two flanges 64 and 40 are such that when the first housing member 30 is engaged with the second housing member 32 the distance between the two covers 62 and 38 is sufficient to house the gearing mechanism 12.

The second housing member 32 is also defined by a plurality of interlocks 24. The interlocks 24 are circular structures and are coaxially aligned with the interlock apertures 52.

The interlocks 24 are capable of engaging with the selector gears 18 and with selector valve assemblies 28. Thus, they have two sides or faces which may be the same or different.

Turning to FIG. 1, the interlocks 24 possess a first face 70 and a second face 72 separated by a body 74. The physical construct of the interlocks 24 may vary. In one embodiment the first face 70 of an interlock possesses an outer diameter that is greater than the diameter of the interlock aperture 66 while the second face 72 possesses an outer diameter that is slightly less than the diameter of the interlock aperture 66.

In other words the second face 72 corresponds to the outer surface of a cylindrical sleeve that extends from the body 74 of the interlock opposite the first face 70. This sleeve extends through the interlock aperture 66. The body 74 of the interlock 24 functions as a collar preventing the passage of the interlock 24 through the interlock aperture 66. Those skilled the art recognize that the opposite arrangement is possible as well (i.e., where the sleeve extends into the housing toward the selector gears 18).

Alternatively, the interlock 24 can be formed of two separate cylindrical pieces, each having an outer diameter that is greater than the diameter of the interlock aperture 66 and an inner diameter that is slightly less than the diameter of the interlock aperture 66. In this embodiment the two separate pieces would engage with each other (e.g., snap together) within the interlock aperture 66.

The faces of the interlocks 24 are designed to engage with the selector gears 18 and standard selector valve assemblies.

Figure 3:
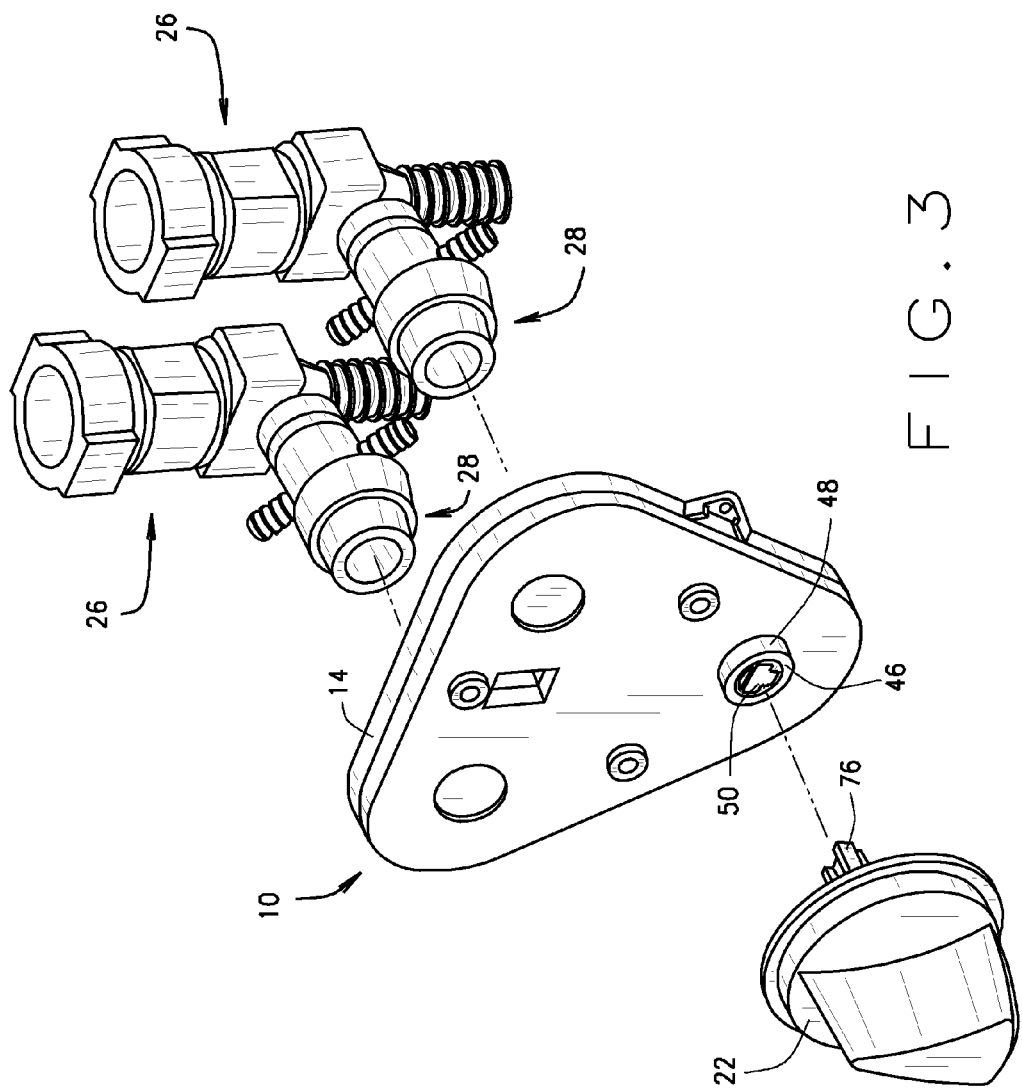
FIG. 3 is an exploded view of an assembly according to the invention prior to engagement with eductor valve assemblies.

Similarly, the second face 72 of each interlock 24 is designed to detachably engage with the selector valve assembly 28 of an eductor 26. A representative valve assembly 28 of a standard commercially available eductor 26 is shown in FIG. 3. The exact design of the second face 72 can vary depending upon the design of the valve assembly. Those skilled in the art are capable of designing a second face 72 architecture suitable for engaging a particular type or brand of valve assembly 28. In some embodiments, the selector valve assemblies may be provided with structural features that mate with corresponding structures on the second face 72 of the interlocks. When so engaged, the selector valve assemblies 28 are unable to rotate independently of the interlocks.

The invention also encompasses a method for controlling eductive dispensing of fluids from a plurality of fluid sources. In broad terms the method according to the invention comprises the steps of providing an assembly 10 such as those discussed above.

Figure 4:
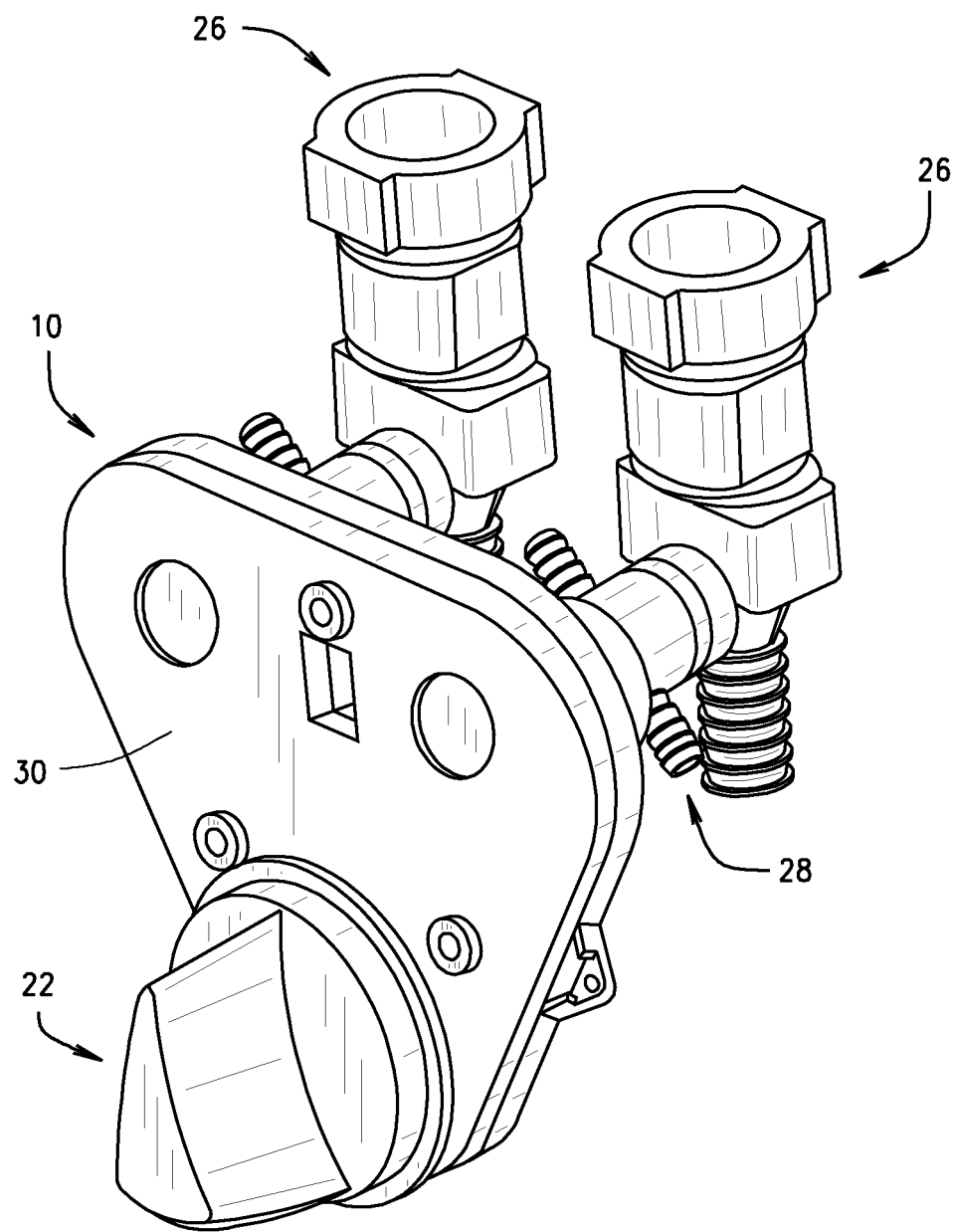
FIG. 4 is a view illustrating an assembly according to the invention engaged with eductor valve assemblies.

The method continues by engaging a gearing mechanism 12 with a plurality of rotatable selector valve assemblies 28 as shown in FIG. 4. In preferred embodiments, the gearing mechanism 12 comprises a control gear 16, a plurality of selector gears 18 in rotational engagement with the plurality of selector valve assemblies 28, and a timing belt 20 that transfers rotational energy from the control gear 16 to the plurality of selector gears 18.

After the gearing mechanism is engaged, the method continues by rotating the control gear 16 thereby rotating the selector gears 18 and the selector valve assemblies 28 to selectively establish fluid communication between the fluid sources and the eductor assemblies 26.

Once the desired fluid communication is established, at least one and preferably two, of a plurality of eductors attached to the plurality of selector valve assemblies 28 is activated thereby selectively dispensing at least one fluid from said fluid sources.

In preferred embodiments a control knob 22 engages with the control gear 16. Rotation of the control knob 22 facilitates rotation of the control gear 16, the selector gears 18, and selector valve assemblies 28 to selectively establish intermittent fluid communication between fluid sources and eductor assemblies 26.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. An assembly for controlling eductive dispensing of multiple fluids from a plurality of sources, comprising:
   a housing;
   a gearing mechanism within said housing, said gearing mechanism comprising:
      a control gear;
      a plurality of selector gears in communication with said control gear; and
      a drive mechanism in communication with said control gear and said plurality of selector gears; and
   a plurality of eductors positioned and located outside of said housing, each of said eductors having a selector valve assembly that is rotationally engaged with one of said selector gears such that rotation of said control gear rotates said selector gears, said drive mechanism, and said selector valve assemblies such that the selector valve assemblies complete the same angle of rotation as said control gear, in the same direction as said control gear and said drive mechanism.

2. The assembly as set forth in claim 1, further comprising a mechanism to transfer rotational movement of said control gear to said plurality of selector gears.

3. The assembly as set forth in claim 1, wherein said control gear comprises a control stem that engages with a control aperture in said housing, said control stem further engaging with a control knob.

4. The assembly as set forth in claim 1 wherein there are at least two selector gears.

5. A method for controlling eductive dispensing of fluids from a plurality of fluid sources, comprising:
   engaging a gearing mechanism with a plurality of rotatable selector valve assemblies wherein said gearing mechanism comprises a single control gear, a plurality of selector gears in rotational engagement with said plurality of selector valve assemblies and in communication with said single control gear, and a drive mechanism, and wherein said gearing mechanism is positioned and located within a housing;
   rotating said control gear thereby rotating said drive mechanism and said selector gears and said selector valve assemblies such that the selector valve assemblies complete the same angle of rotation as said control gear, in the same direction as said drive mechanism and said control gear to selectively establish fluid communication between said fluid sources and eductor assemblies associated with said selector valve assemblies, wherein said eductor assemblies and said selector valve assemblies are positioned and located outside of said housing; and
   actuating at least one of said eductor assemblies thereby selectively dispensing at least one fluid from said fluid sources.

6. The method according to claim 5 wherein said step of rotating said control gear comprises rotating a control knob engaged with said control gear.

7. The method according to claim 5 wherein the actuating step comprises actuating at least one eductor to dispense at least one fluid from said plurality of fluid sources.

8. An assembly for controlling eductive dispensing of multiple fluids from a plurality of sources, comprising:
   a housing;
   a gearing mechanism within said housing, said gearing mechanism comprising:
      a control gear;
      a plurality of selector gears in communication with said control gear; and
      a timing belt in communication with said control gear and said plurality of selector gears; and
   a plurality of eductors positioned and located outside of said housing, each of said eductors having a selector valve assembly that is rotationally engaged with one of said selector gears such that rotation of said control gear rotates said selector gears, said timing belt, and said selector valve assemblies such that the selector valve assemblies complete the same angle of rotation as said control gear, in the same direction as said control gear and said timing belt.

\* \* \* \* \*